United States Patent

Inabata

[11] Patent Number: 5,034,763
[45] Date of Patent: Jul. 23, 1991

[54] VIEWFINDER OPTICAL SYSTEM
[75] Inventor: Tatsuo Inabata, Tokyo, Japan
[73] Assignee: Olympus Optical Co., Ltd., Tokyo, Japan
[21] Appl. No.: 524,923
[22] Filed: May 18, 1990
[30] Foreign Application Priority Data May 19, 1989 [JP] Japan .................. 1-124271

[51] Int. Cl.$^5$ ............................................ G03B 13/02
[52] U.S. Cl. ................................. 354/219; 350/410; 350/481; 350/569
[58] Field of Search ............... 354/219, 220, 221, 222, 354/223, 224, 225, 151, 155; 350/410, 414, 432, 481, 501, 569

[56] References Cited

U.S. PATENT DOCUMENTS

| Re. 17,995 | 3/1931 | Mitchell | 354/219 |
|---|---|---|---|
| 3,587,383 | 6/1977 | Ikezu | 354/225 |
| 4,265,529 | 5/1981 | Yokota | 354/224 |
| 4,593,984 | 1/1986 | Kimura et al. | 354/219 |
| 4,664,485 | 5/1987 | Momiyama et al. | 350/410 |
| 4,731,625 | 3/1988 | Nozawa | 354/155 |

FOREIGN PATENT DOCUMENTS

| 2909089 | 9/1979 | Fed. Rep. of Germany . |
| 54-119233 | 9/1979 | Japan . |
| 61-156018 | 7/1986 | Japan . |

Primary Examiner—Russel E. Adams
Assistant Examiner—Howard B. Blankenship
Attorney, Agent, or Firm—Cushman, Darby & Cushman

[57] ABSTRACT

A Keplerian or real image type of viewfinder optical system comprising an objective lens system and an eyepiece lens system for allowing observation of an intermediate image formed by the objective lens system. The viewfinder optical system has a space sufficiently widened for arranging the prisms for vertically and horizontally inverting an intermediate image by composing the eyepiece lens system of a first lens component having positive refractive power and a second lens component having negative refractive power, and locating the first lens component and the second lens component at locations rather close to the eye point of the eyepiece lens system without prolonging the focal length of the eyepiece lens system as a whole.

18 Claims, 9 Drawing Sheets

VIEWFINDER OPTICAL SYSTEM

BACKGROUND OF THE INVENTION a) Field of the Invention

The present invention relates to a viewfinder optical system for silver salt cameras, still video cameras, video cameras, etc., and more specifically Keplerian viewfinder optical system.

b) Description of the Prior Art

Viewfinders are classified into the so-called virtual image type which includes Albada viewfinders and inverted Galilean viewfinders, and the so-called real image type which includes Keplerian viewfinders.

Figure 1:
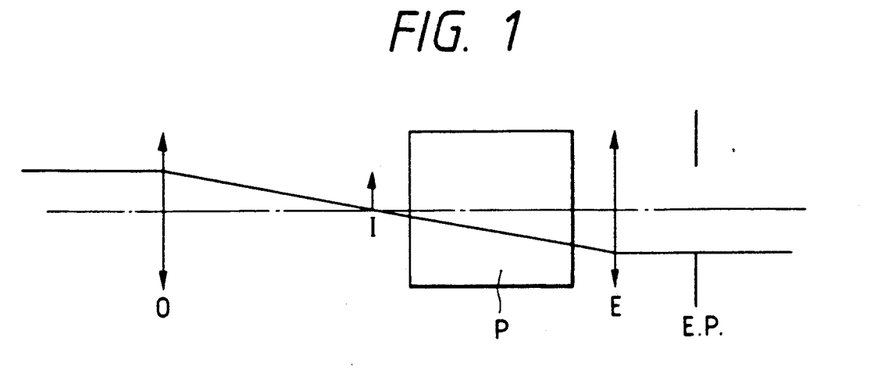
FIG. 1 shows a sectional view illustrating the composition of the Keplerian viewfinder.

Out of the viewfinders mentioned above, the Keplerian viewfinder consists, as shown in FIG. 1, of an objective lens system O which functions to form an image of a visual field on an intermediate image surface I corresponding to the image formed on the photographing screen by a photographic lens and an eyepiece system E which functions to magnify the image of the visual field as a virtual image. In addition, a relay imaging system for vertically and horizontally inverting the image or an optical system comprising porro prisms, etc is arranged at an optional location in the optical path of the Keplerian viewfinder.

As a conventional example of the viewfinder optical systems used in this type of viewfinder, there is known the optical system disclosed by Japanese Patent Kokai Publication No. Sho 61-156018.

Figure 2:
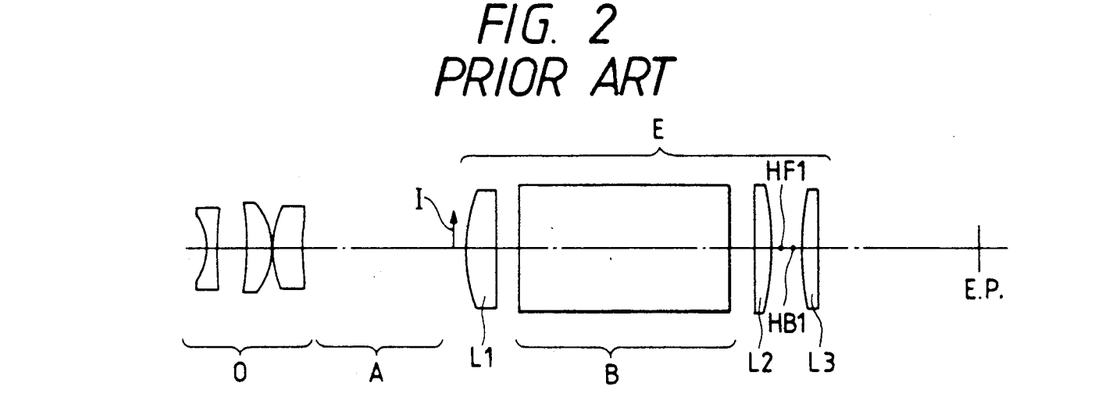
FIG. 2 shows a sectional view illustrating the composition of the conventional viewfinder optical system.

This conventional viewfinder optical system has the composition illustrated in FIG. 2, i.e., consists of an objective lens system O which comprises three lens components of three lens elements and an eyepiece lens system which comprises three lens components of three lens elements. In this optical system, the first lens component L1 of the eyepiece lens system E is lens component for relaying a pupil, whereas the second lens component L2 and the third lens component L3 have positive refractive powers respectively. This optical system is designed in such a manner that an intermediate image I is formed before the eyepiece lens system E and in the vicinity thereof, and prisms for vertically and horizontally inverting the image are to be arranged in the airspace represented by the reference symbol A and the prism section designated by the reference symbol B in FIG. 2. This conventional viewfinder optical system has an eye point set at a location 13.5 mm after the eyepiece lens system E, and the optical system composed of the two eyepiece lens components arranged on the eye point side of the section B locates the front principal point at the position of HF1 and the rear principal point at the position of HB1. The front principal point is located at a position 32 mm as measured from the vertex of the object side surface of the object side lens component L2 in the direction toward the eye point, whereas the rear principal point HB1 is located at a position 2.32 mm as measured from the vertex of the eye point side surface of the eyepoint side lens component L3 in the direction toward the object side. The front principal point HF1 and the rear principal point HB1 are located within the viewfinder optical system.

In the conventional viewfinder optical system described above, the objective lens system has a half field angle of 24.7° on the side of incidence at the wide position and a focal length of 9.975 mm, whereby the intermediate image has a height of 4.59 mm.

When the Rica size of a photographic plane is taken as an example, the ratio of lengths of the plane is:

Diagonal length: length of longer side: length of shorter side = 1:0.832:0.555

Figure 3A:
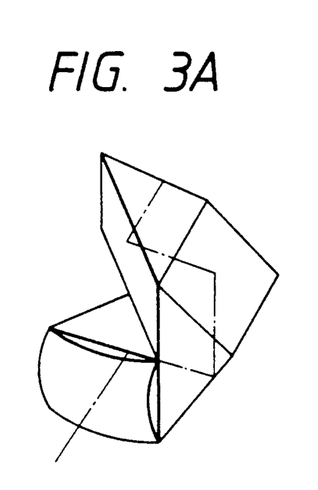
FIG. 3A and FIG. 3B show perspective views illustrating examples of the prisms used in the view-finder optical system.
Figure 3B:
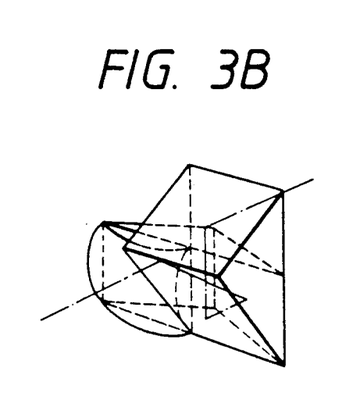

When either of the two types of porro prisms shown in FIG. 3A and FIG. 3B is used, the prism folds the optical axis of the optical system twice in the direction along the longer side and twice in the direction along the shorter side. When the ray passing through the portion of the prism which is the farthest from the optical axis is nearly parallel with the optical axis, the space required for arranging the prisms must have a length on the optical axis equal to the longer side × 2 + length of the shorter side × 2.

Calculating on the basis of the intermediate image height in the above-described conventional view-finder optical system and the ratio in lengths on the photographic plane, the length on the optical axis required for arranging the prisms is 25.47 mm. However, the section B of the above-described conventional example has an optical path length as short as 20 mm. Accordingly, the conventional example does not allow the prisms to be arranged only in the section B, and therefore requires arrangement of the prisms in both the airspace A and the section B, or arrangement of prisms in the section B and mirrors in the airspace A.

As is understood from the foregoing description, the conventional viewfinder optical system cannot adopt a composition wherein only a prism having four reflecting surfaces is arranged, whereby the conventional viewfinder optical system is composed of a large number of optical members, retaining members therefor, etc., and requires a high manufacturing cost.

Further, when each of the above-mentioned optical members is composed of a plural number of parts, it is more difficult to set each of the reflecting surface relative to the optical axis with high angle precision than in a case where each of the optical members is composed of a single part.

Though it is considered to prolong the focal length of the eyepiece lens system as a whole for prolonging the optical path lengths of the prisms, such a measure will lower magnification of the viewfinder and makes it impossible to observe images of desirable sizes.

SUMMARY OF THE INVENTION

A primary object of the present invention is to provide a Keplerian viewfinder optical system comprising an objective lens system and an eyepiece lens system, and having an airspace which is sufficiently widened, without prolonging focal length of the viewfinder optical system, by displacing the lens components composing the eyepiece lens system toward the eyepoint without changing the location of the principal points of said eyepiece lens system.

Figure 4:
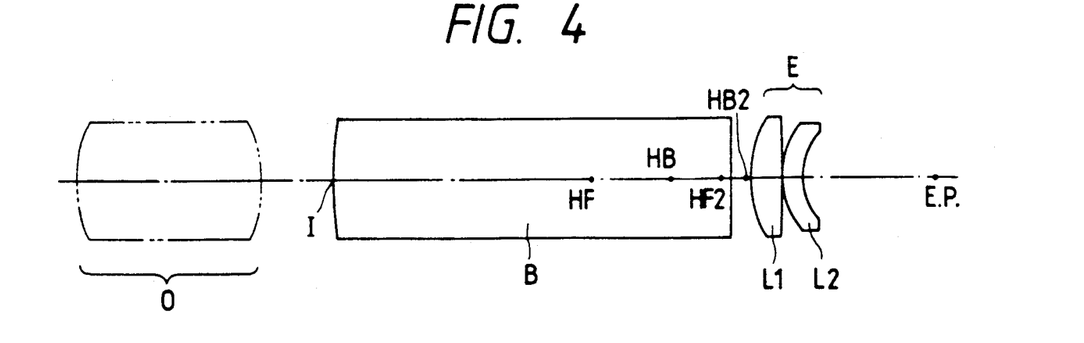
FIG. 4 shows a sectional view illustrating the fundamental composition of the viewfinder optical system according to the present invention.

The viewfinder optical system according to the present invention has the fundamental composition illustrated in FIG. 4. Speaking concretely, the viewfinder optical system according to the present invention is a Keplerian type or the real image type viewfinder optical system consisting of the objective lens system O and the eyepiece lens system which are arranged sequentially from the object side. In this optical system, the lens system located on the side of the eye point EP. from the intermediate image I formed by the objective lens system O, i.e., the eyepiece lens system E located on the side of the eye point EP from the prism section B is composed, in the order from the side of the intermediate image point I, of a first positive lens component L1 and a second negative lens component L2. The composition described above may be replaced with another composition wherein the prism section B, i.e., the optical system for vertically and horizontally inverting an image is integrated with the first positive lens component L1, and the second negative lens component L2 is arranged on the eye point side of the optical system. Further, it is desirable to arrange a meniscus lens element having a concave surface on the eye point side in the second negative lens element, since such a meniscus lens element can lessen the burden on the refractive power of the viewfinder optical system the marginal ray out of the rays passing through the viewfinder optical system and therefore enhance image quality at the marginal portion.

It is desirable that the viewfinder optical system having the composition described above is designed so as to satisfy the following condition (1):

$$0.11 \leq |HB/D_1| + 0.16 \times |f/f_2| \leq 0.91 \qquad (1)$$

wherein the reference symbol f represents the focal length of the optical system arranged between the intermediate image surface to the eye point (the eyepiece lens system), the reference symbol $f_2$ designates the focal length of the second lens component L2, the reference symbol HB denotes the distance as measured from the eye point to the rear principal point of the eyepiece lens system and the reference symbol $D_1$ represents the length of the eyepiece lens system as a whole as measured on the optical axis.

By composing the eyepiece lens system of the first positive lens component L1 and the second negative lens component L2, the viewfinder optical system according to the present invention is designed as the retrofocus type wherein the front principal point and the rear principal point of the eyepiece lens system are brought closer to the prism section.

The front principal point of the eyepiece lens system having the composition described above is determined uniquely by the focal length of the eyepiece lens system as a whole. Further, the rear principal point of the eyepiece lens system having the composition described above is determined by the front principal point and the rear principal point of the optical system which is composed of the frist lens component L1 and the second lens unit L2. That is to say, the rear principal point of the eyepiece lens system as a whole is far from the intermediate image surface when both the principal points of the optical system composed of the first and second lens components are located close to the intermediate image surface respectively. Reversely, the rear principal point of the eyepiece lens system is near the intermediate image surface when both the principal points of the optical system composed of the first and second lens components are far from the intermediate image surface respectively.

When the total length $D_1$ of the eyepiece lens system is taken as the distance as measured from the intermediate image surface to the eye point, the value of $|HB/D_1|$ mentioned in the condition (1) is usable as an index indicating the location of the rear principal point in the section of the total length of the eyepiece lens system. In other words, the value of $|HB/D_1|$ is usable as an index indicating the retroratio. Speaking concretely, a large value of $|HB/D_1|$ indicates a low retroratio, whereas a small value of $|HB/D_1|$ indicates a high retroratio. That is to say, the retroratio is lowered as $|HB/D_1|$ has a larger value, and vice versa.

When $|f/f_2|$ is determined in the condition (1) so as to have such a value as to establish a relation satisfying the condition (1) with regard to the value of $HB/D_1$ indicating the retroratio, the retrofocus function is effective.

If the upper limit of the condition (1) is exceeded, f2 will have a value which is too small for the value of f, i.e., the second lens component will have too strong a power, produce astigmatism and coma which cannot be corrected by using aspherical surfaces, and degrade image quality.

If the lower limit of the condition (1) is exceeded, the refractive power of the second lens component will be weakened, thereby making it impossible to reserve a sufficient length to the eye point.

When optical path length of the prism section on the optical axis (thickness of the prisms/refractive index of the prisms) is represented by a reference symbol $D_2$, the number of reflections for folding the optical axis in the prism section is designated by a reference symbol m and the image height on the intermediate image surface is denoted by a reference symbol IH, the value of $|D_2/m.IH|$ represents a margin allowing a ray to pass straight through the prisms. It is desirable for reserving the required optical path length and maintaining good image quality to set within the range defined by the following condition (2) the relationship between the margin $|D_2/m.IH|$ and the abovedescribed retroratio:

$$|HB/D_1| - 0.7 \times |D_2/m.IH| \leq -0.15 \qquad (2)$$

If the upper limit of the condition (2) is exceeded with the value of $|HB/D_1|$ kept unchanged, $|D_2/m.IH|$ will have a smaller value, thereby making it impossible for the prisms to cut off a light bundle having sufficient thickness light bundle at the required number of times.

The viewfinder optical system according to the present invention described above is capable of correcting aberrations such as spherical aberration and coma more favorably by using at least one aspherical surface in the first lens component and/or the second lens component.

DETAILED DESCRIPTION OF THE PREFERRED EMBODIMENTS

Now, the present invention will be described more detailedly with reference to the preferred embodiments illustrated in the accompanying drawings and given in the form of the following numerical data:

Embodiment 1

| | | | |
|---|---|---|---|
| $r_1 = 44.9673$ | $d_1 = 41.5$ | $n_1 = 1.49216$ | $\nu_1 = 57.5$ |
| $r_2 = \infty$ | $d_2 = 2.1768$ | | |
| $r_3 = 12.0898$ | $d_3 = 3.0$ | $n_2 = 1.49216$ | $\nu_2 = 57.5$ |
| $r_4 = 511.1368$ | $d_4 = 0.2$ | | |
| $r_5 = 8.9697$ | $d_5 = 2.0$ | $n_3 = 1.49216$ | $\nu_5 = 57.5$ |
| (aspherical surface) | | | |
| $r_6 = 7.3025$ | $d_6 = 13.5$ | | |
| $r_7$ = eye point | | | | aspherical coefficient
$E = -0.6955 \times 10^{-4}$,  $F = -0.12929 \times 10^{-5}$
$G = -0.15034 \times 10^{-8}$
  $HB = 27.308$,  $D_1 = 62.38$,  $f = 27.262$
  $f_2 = -132.097$,  $f_1 = 25.110$,  $D_2 = 27.81$
  $m = 4$,  $IH = 5.379$,  $I = 0.47$,  $II = -0.47$
  radius of pupil = 2

Embodiment 2

| | | | |
|---|---|---|---|
| $r_1 = 34.495$ | $d_1 = 33.5$ | $n_1 = 1.49216$ | $\nu_1 = 57.5$ |
| $r_2 = \infty$ | $d_2 = 2.7041$ | | |
| $r_3 = 14.168$ | $d_3 = 2.35$ | $n_2 = 1.49216$ | $\nu_2 = 57.5$ |
| $r_4 = 102.195$ | $d_4 = 0.2$ | | |
| $r_5 = 6.8205$ | $d_5 = 2.0$ | $n_3 = 1.49216$ | $\nu_5 = 57.5$ |
| (aspherical surface) | | | |
| $r_6 = 6.056$ | $d_6 = 13.5$ | | |
| $r_7$ = eye point | | | | aspherical coefficient
$E = -0.67287 \times 10^{-4}$,  $F = -0.12514 \times 10^{-6}$
$G = -0.72638 \times 10^{-7}$
  $HB = 27.79$,  $D_1 = 54.25$,  $f = 27.262$
  $f_2 = -800.881$,  $f_1 = 33.129$,  $D_2 = 30.45$
  $m = 4$,  $IH = 5.379$,  $I = 0.52$,  $II = -0.48$
  radius of pupil = 2

Embodiment 3

| | | | |
|---|---|---|---|
| $r_1 = 85.9957$ | $d_1 = 41.9633$ | $n_1 = 1.49216$ | $\nu_1 = 57.5$ |
| $r_2 = \infty$ | $d_2 = 2.1768$ | | |
| $r_3 = 9.1129$ | $d_3 = 3.0$ | $n_2 = 1.49216$ | $\nu_2 = 57.5$ |
| $r_4 = -71.0398$ | $d_4 = 0.2$ | | |
| $r_5 = 27.2280$ | $d_5 = 2.0$ | $n_3 = 1.49216$ | $\nu_5 = 57.5$ |
| (aspherical surface) | | | |
| $r_6 = 9.6926$ | $d_6 = 13.5$ | | |
| $r_7$ = eye point | | | | aspherical coefficient
$E = -0.21797 \times 10^{-3}$,  $F = -0.65558 \times 10^{-6}$
$G = -0.27198 \times 10^{-8}$
  $HB = 23.786$,  $D_1 = 62.84$,  $f = 27.262$
  $f_2 = -31.775$,  $f_1 = 16.616$,  $D_2 = 28.12$
  $m = 4$,  $IH = 5.379$,  $I = 0.52$,  $II = -0.53$
  radius of pupil = 2

Embodiment 4

| | | | |
|---|---|---|---|
| $r_1 = 27.7002$ | $d_1 = 43.9666$ | $n_1 = 1.49216$ | $\nu_1 = 57.5$ |
| $r_2 = \infty$ | $d_2 = 2.1768$ | | |
| $r_3 = 7.8598$ | $d_3 = 3.0$ | $n_2 = 1.49216$ | $\nu_2 = 57.5$ |
| $r_4 = 18.5216$ | $d_4 = 0.2$ | | |
| $r_5 = 8.8487$ | $d_5 = 2.0$ | $n_3 = 1.49216$ | $\nu_5 = 57.5$ |
| (aspherical surface) | | | |
| $r_6 = 7.2080$ | $d_6 = 13.5$ | | |
| $r_7$ = eye point | | | | aspherical coefficient
$E = -0.24046 \times 10^{-3}$,  $F = -0.45382 \times 10^{-5}$
$G = -0.42959 \times 10^{-7}$
  $HB = 33.504$,  $D_1 = 64.84$,  $f = 27.262$
  $f_2 = -132.100$,  $f_1 = 25.387$,  $D_2 = 29.47$
  $m = 4$,  $IH = 5.379$,  $I = 0.55$,  $II = -0.44$ -continued

Embodiment 4 radius of pupil = 2

Embodiment 5

| | | | |
|---|---|---|---|
| $r_1 = 44.9673$ | $d_1 = 45.0$ | $n_1 = 1.49216$ | $\nu_1 = 57.5$ |
| $r_2 = \infty$ | $d_2 = 2.1768$ | | |
| $r_3 = 7.6748$ | $d_3 = 3.0$ | $n_2 = 1.49216$ | $\nu_2 = 57.5$ |
| (aspherical surface) | | | |
| $r_4 = 24.3887$ | $d_4 = 0.2$ | | |
| $r_5 = 8.4072$ | $d_5 = 2.0$ | $n_3 = 1.49216$ | $\nu_5 = 57.5$ |
| (aspherical surface) | | | |
| $r_6 = 5.9562$ | $d_6 = 13.5$ | | |
| $r_7$ = eye point | | | | aspherical coefficient
(3rd surface)
$E = -0.18615 \times 10^{-3}$,  $F = -0.20159 \times 10^{-5}$
$G = -0.84119 \times 10^{-7}$
(5th surface)
$E = -0.57379 \times 10^{-3}$,  $F = -0.31852 \times 10^{-5}$
$G = -0.51494 \times 10^{-7}$
  $HB = 28.899$,  $D_1 = 65.88$,  $f = 27.262$
  $f_2 = -56.800$,  $f_1 = 21.483$,  $D_2 = 30.16$
  $m = 4$,  $IH = 5.379$,  $I = 0.52$,  $II = -0.54$
  radius of pupil = 2

Embodiment 6

| | | | |
|---|---|---|---|
| $r_1 = 55.5083$ | $d_1 = 42.9989$ | $n_1 = 1.49216$ | $\nu_1 = 57.5$ |
| $r_2 = \infty$ | $d_2 = 2.1768$ | | |
| (aspherical surface) | | | |
| $r_3 = 10.6205$ | $d_3 = 3.0$ | $n_2 = 1.49216$ | $\nu_2 = 57.5$ |
| (aspherical surface) | | | |
| $r_4 = -646.1387$ | $d_4 = 0.2$ | | |
| $r_5 = 8.4577$ | $d_5 = 2.0$ | $n_3 = 1.49216$ | $\nu_5 = 57.5$ |
| $r_6 = 6.0007$ | $d_6 = 13.5$ | | |
| $r_7$ = eye point | | | | aspherical coefficient
(2nd surface)
$E = 0.94183 \times 10^{-4}$,  $F = -0.33434 \times 10^{-6}$
$G = 0.24601 \times 10^{-7}$
(3rd surface)
$E = 0.27974 \times 10^{-4}$,  $F = -0.17659 \times 10^{-6}$
$G = 0.38516 \times 10^{-8}$
  $HB = 26.466$,  $D_1 = 63.876$,  $f = 27.262$
  $f_2 = -57.375$,  $f_1 = 21.262$,  $D_2 = 28.816$
  $m = 4$,  $IH = 5.379$,  $I = 0.49$,  $II = -0.52$
  radius of pupil = 2

Embodiment 7

| | | | |
|---|---|---|---|
| $r_1 = 45.4951$ | $d_1 = 40.4968$ | $n_1 = 1.49216$ | $\nu_1 = 57.50$ |
| $r_2 = \infty$ | $d_2 = 2.1768$ | | |
| $r_3 = 41.6086$ | $d_3 = 2.5000$ | $n_2 = 1.49216$ | $\nu_2 = 57.50$ |
| $r_4 = -34.5911$ | $d_4 = 0.5000$ | | |
| $r_5 = 12.6596$ | $d_5 = 1.5000$ | $n_3 = 1.49216$ | $\nu_5 = 57.50$ |
| $r_6 = 19.1291$ | $d_6 = 0.2000$ | | |
| $r_7 = 9.0269$ | $d_7 = 2.0000$ | $n_4 = 1.49216$ | $\nu_4 = 57.50$ |
| $r_8 = 7.2970$ | $d_8 = 13.5000$ | | |
| $r_9$ = eye point | | | |

$HB = 26.913$,  $D_1 = 62.874$,  $f = 27.230$
  $f_2 = -125.050$,  $f_1 = 24.918$,  $D_2 = 27.139$
  $m = 4$,  $IH = 5.379$,  $I = 0.46$,  $II = -0.45$
  radius of pupil = 2

Embodiment 8

| | | | |
|---|---|---|---|
| $r_1 = 56.6100$ | $d_1 = 42.9982$ | $n_1 = 1.49216$ | $\nu_1 = 57.50$ |
| $r_2 = \infty$ | $d_2 = 2.1768$ | | |
| $r_3 = 9.7993$ | $d_3 = 2.5000$ | $n_2 = 1.49216$ | $\nu_2 = 57.50$ |
| (aspherical surface) | | | |

-continued

Embodiment 8

| | | | |
|---|---|---|---|
| $r_4 = 59.5840$ | $d_4 = 0.5000$ | | |
| $r_5 = 500.0000$ | $d_5 = 1.5000$ | $n_3 = 1.49216$ | $\nu_5 = 57.50$ |
| $r_6 = 300.0000$ | $d_6 = 0.2000$ | | |
| $r_7 = 9.5324$ | $d_7 = 2.0000$ | $n_4 = 1.49216$ | $\nu_4 = 57.50$ |
| $r_8 = 7.2970$ | $d_8 = 13.5000$ | | |
| $r_9$ = eye point | | | | aspherical coefficient
$E = -0.58596 \times 10^{-4}$,   $F = -0.16660 \times 10^{-5}$
$G = 0.37339 \times 10^{-8}$
HB = 26.890,   $D_1$ = 65.375,   f = 27.262
$f_2 = -84.362$,   $f_1 = 23.442$,   $D_2 = 28.816$
m = 4,   IH = 5.379,   I = 0.46,   II = −0.52
radius of pupil = 2

Embodiment 9

| | | | |
|---|---|---|---|
| $r_1 = 44.6650$ | $d_1 = 45.8923$ | $n_1 = 1.49216$ | $\nu_1 = 57.50$ |
| $r_2 = -14.1256$ | $d_2 = 0.2000$ | | |
| (aspherical surface) | | | |
| $r_3 = 8.1372$ | $d_3 = 2.3800$ | $n_2 = 1.49216$ | $\nu_2 = 57.50$ |
| (aspherical surface) | | | |
| $r_4 = 7.0000$ | $d_4 = 15.0000$ | | |
| $r_5$ = eye point | | | | aspherical coefficient
(2nd surface)
$E = 0.86834 \times 10^{-5}$,   $F = -0.14939 \times 10^{-7}$
$G = 0.10919 \times 10^{-8}$
(3rd surface)
$E = -0.77044 \times 10^{-4}$,   $F = -0.85618 \times 10^{-6}$
$G = -0.20769 \times 10^{-7}$
HB = 27.482,   $D_1$ = 63.472,   f = 27.87
$f_2 = -328.635$,   $D_2 = 30.756$,   m = 4
IH = 4,   I = 0.446,   II = −0.91
radius of pupil = 2 wherein the reference symbol $r_1, r_2, \ldots$ represent radii of curvature on the surfaces of the respective lens elements, the reference symbols $d_1, d_2, \ldots$ designate thicknesses of the respective lens elements and the airspaces reserved therebetween, the reference symbols $n_1$, $n_2$ and $n_3$ denote refractive indices of the respective lens elements, and the reference symbols $\nu_1$, $\nu_2$ and $\nu_3$ represent Abbe's numbers of the respective lens elements. Further, the reference symbols I and II included in the numerical data have the values which are related to the conditions (1) and (2), and given by the following formulae:

$$I = |HB/D_1| + 0.16|f/f_2|$$

$$II = |HB/D_1| - 0.7|D_2/m.IH|$$

When distance as measured in the direction along the optical axis is represented by x and distance as measured in the direction perpendicular to the optical axis is designated by s, shapes of the aspherical surfaces used in the above-described embodiments are expressed by the following formula:

$$x = \frac{Cs^2}{1 + \sqrt{1 - C^2s^2}} + Es^4 + Fs^6 + Gs^8$$

wherein the reference symbol C represents the inverse number of radius of curvature on the aspherical surface as measured in the vicinity of the optical axis, and the reference symbols E, F and G designate the aspherical surface coefficients of the fourth, sixth and eighth orders respectively.

Figure 5:
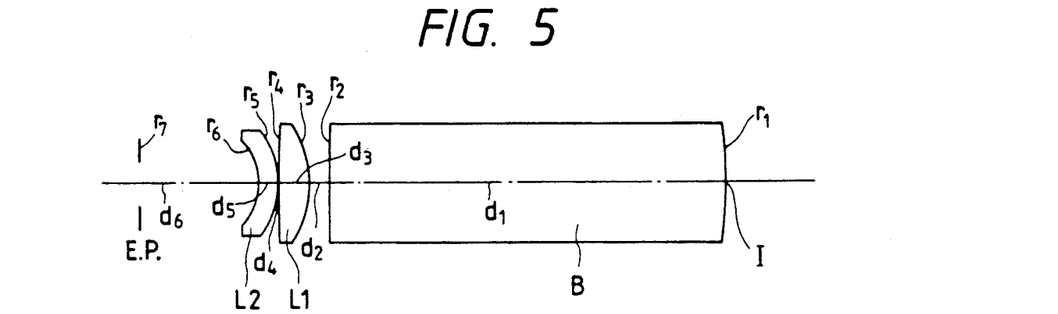
FIG. 5 through FIG. 13 show sectional views illustrating compositions of Embodiments 1 through 9 of the eyepiece lens system of the viewfinder optical system according to the present invention.

The Embodiment 1 has the composition illustrated in FIG. 5 wherein the viewfinder optical system is composed of a prism section B designed as a field lens having an end surface located in the vicinity of the intermediate image surface on which an image is to be formed by the objective lens system, and a first lens component L1 having positive power and a second lens component L2 having negative power which are arranged sequentially on the eye point side of the prism section (leftward on FIG. 5).

The lens system composed of the first lens component L1 and the second lens component L2 of the Embodiment 1 has a front principal point located at a point 2.99 mm as measured from the object side vertex of the first lens component in the direction toward the object side and a rear principal point located at a point 5.75 mm as measured from the eye point side vertex of the second lens component in the direction toward the object side. These locations of the front and rear principal points are obtained by designing the Embodiment 1 as a positive-negative retrofocus type as viewed from the eye point side which is composed of the first positive lens component L1 and the second negative lens component L2. Owing to this composition, the front principal point and the rear principal point are located outside the optical system which is composed of the first lens component L1 and the second lens component L2. Speaking concretely, the front principal point and the rear principal point are located at the points represented by H and HB respectively in FIG. 4 illustrating the fundamental composition of the viewfinder optical system according to the present invention.

By selecting the composition described above, it is possible to arrange the first lens component L1 and the second lens component L2 at the locations closer to the eye point with the front principal point and the rear principal point located at the points which are the same as those in the conventional viewfinder optical system as viewed from the intermediate image surface. Accordingly, it becomes possible to arrange prisms having long optical path lengths, while maintaining the same focal length as that of the conventional optical system, in the space which is obtained by displacing the first and second lens components toward the eye point. It is therefore possible to obtain an optical path length of 41.5 mm which is sufficiently longer than the optical path length of 25.45 mm required for the vertical-to-horizontal ratio of Rica size at the image height of 4.59 mm of the conventional optical system or an optical path length of 29.8 mm required for the vertical-to-horizontal ratio of Rica size at the design image height of 5.38 mm adopted for the Embodiment 1. The Embodiment 1 is designed on the basis of the fundamental composition described above, and adopts an aspherical surface as the surface of the second lens component which is located on the side of the first lens component. Further, both the first lens component and the second lens component are made of plastic. Furthermore, the prism section is designed as a field lens which has refractive power only of the end surface of incidence thereof and no refractive power of the end surface of emergence, and total refractive power of the first lens component L1 and the second lens component L2 is strengthened.

In the optical system preferred as the Embodiment 1 which is composed as described above, the function of a magnifying lens to enlarge the image formed by the objective lens system as a virtual image is imparted mainly to the total power of the first lens component L1 and the second lens component L2, whereas no power is imparted to the prism section. Further, by designing one of the surfaces of the second lens component L2 as the aspherical surface, the burden on the power of the surface of the second lens component L2 for the paraxial marginal ray and the marginal subsidiary ray around the pupil of the surface is lessened, and mainly spherical aberration and coma are corrected for improving image quality. In addition, it is possible to design the eye point side surface of the second lens component as an aspherical surface or both the surfaces of the second lens component as aspherical surfaces.

Embodiment 1 permits easily adjusting diopter by varying the airspace reserved between the prisms and the first lens component L1.

The first lens component L1 and the second lens component L2 both of which are made of plastic can be manufactured by the monolithic molding at reduced costs.

Figure 6:
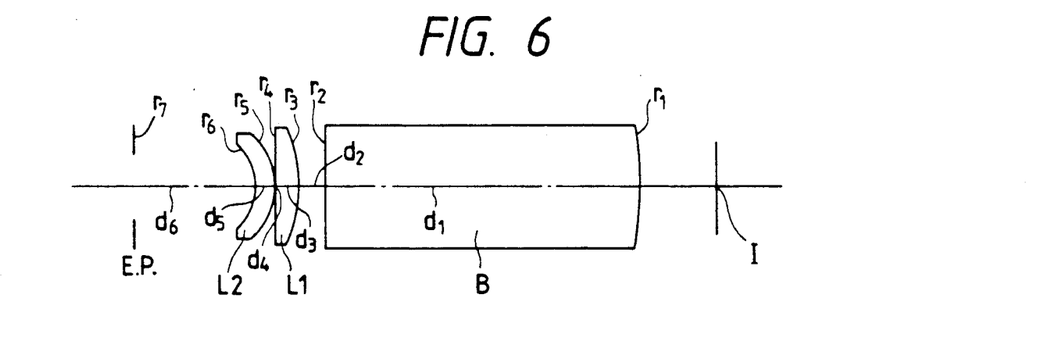
Figure 7:
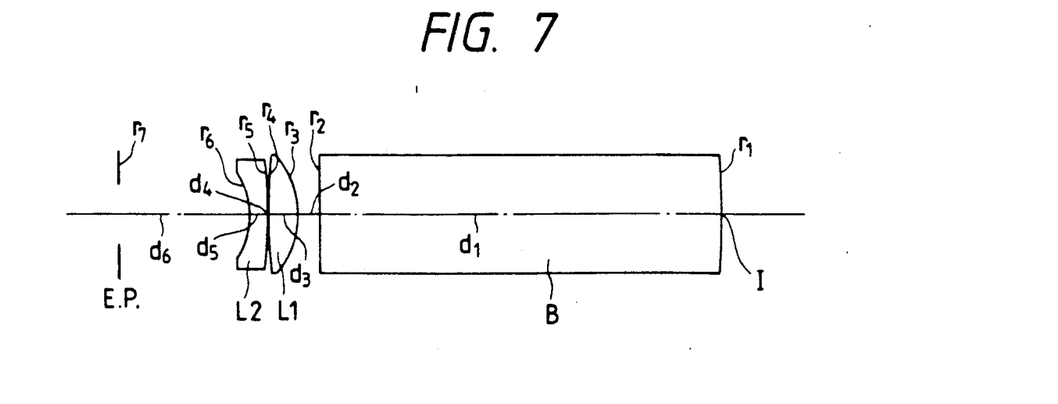
Figure 8:
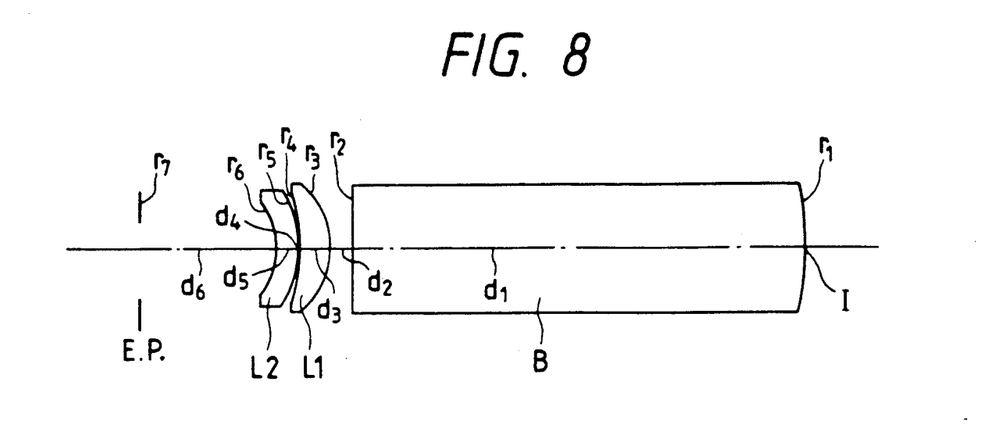

Embodiments 2 through 4 have the compositions illustrated in FIG. 6 through FIG. 8 respectively which are similar to the composition of Embodiment 1.

Figure 9:
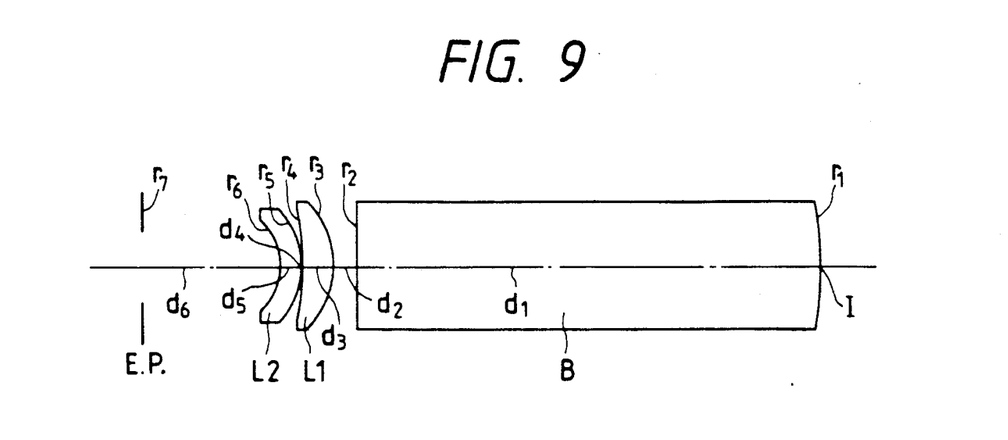

Embodiment 5 has the composition shown in FIG. 9 which is fundamentally the same as that of Embodiment 1. In Embodiment 5, however, aspherical surfaces are used as the surface of the first lens component L1 which is located on the side of the prisms and the surface of the second lens component L2 which is located on the side of the first lens component L1. These aspherical surfaces may be located on the opposite sides respectively or on both the sides of either of the lens components.

In Embodiment 5, mainly the second lens component L2 serves for lessening the burden on the power for the paraxial marginal ray and marginal subsidiary ray around the eye point. Further, the second lens component L2 serves for lessening the burden on the function to balance the marginal subsidiary ray with the marginal principal ray. Furthermore, the first lens component L1 lessens the burdens on the power for the principal ray around the image height and the function to balance the marginal subsidiary ray with the marginal principal ray.

With the functions described above, the second lens component L2 favorably corrects mainly spherical aberration, coma and astigmatism, whereas the first lens component L1 favorably corrects mainly astigmatism and distortion.

With respect to the points other than those described above, Embodiment 5 remains unchanged from Embodiment 1 and the other embodiments described above.

Figure 10:
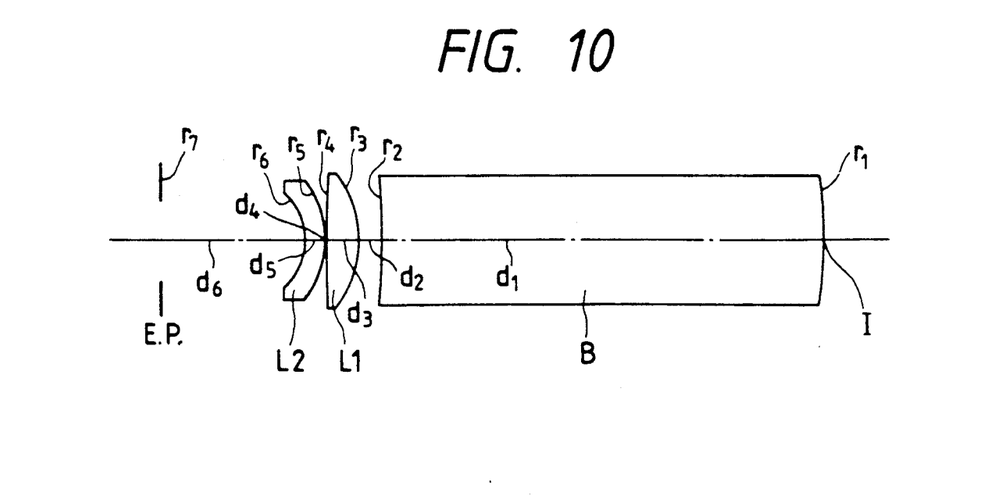

Embodiment 6 has the composition illustrated in FIG. 10 which is similar to those of Embodiment 1 and so on. In Embodiment 6, however, the surface of the first lens component L1 which is located on the side of the prisms is designed as an aspherical surface. Further, the emergence side surface of the prism section B has no power in the vicinity of the optical axis but is made aspherical as the portions thereof are farther from the optical axis.

In Embodiment 6, the burden on the power mainly for the principal ray around the image height and the burden on the function to balance the marginal subsidiary ray are lessened by adopting the aspherical surface as the surface of the first lens component L1 which is located on the side of the prisms. This aspherical surface serves for correcting mainly coma and astigmatism favorably for improving image quality.

Further, the burden on the power mainly for the principal ray around the image height and the burden for the function to balance the marginal subsidiary ray are lessened also by adopting the aspherical surface as the surface of the prism section which is located on the side of the first lens component L1. This aspherical surface serves for favorably correcting coma and astigmatism for improving image quality.

Embodiment 6 also permits adjusting diopter by varying the airspace reserved between the prism section B and the first lens component L1.

Figure 11:
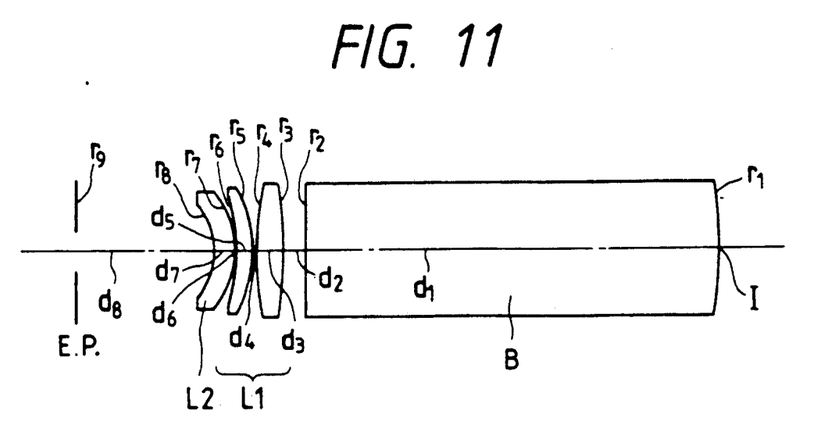

Embodiment 7 has the composition illustrated in FIG. 11 wherein the eyepiece lens system comprises a first lens component L1 which has positive power as a whole and consists of two lens elements, and a second meniscus lens component L2. In Embodiment 7, all the surfaces are designed as spherical surfaces but the function, etc. of each of the lens components remain unchanged from those in Embodiment 1 and the other embodiments described above.

Figure 12:
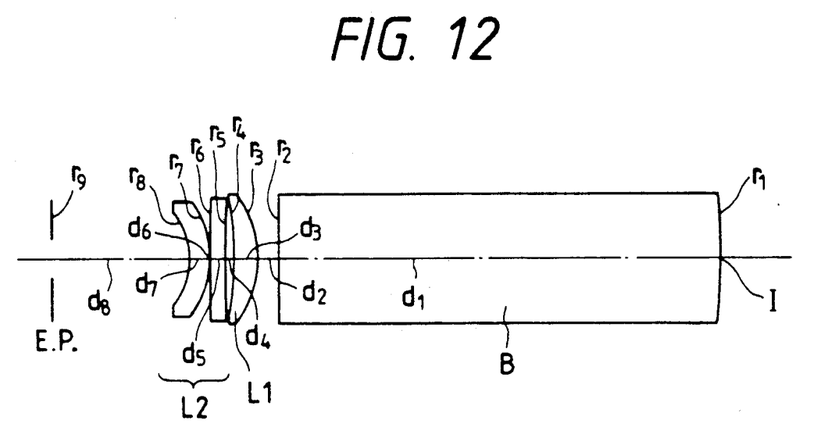

Embodiment 8 has the composition shown in FIG. 12 wherein the eyepiece lens system comprises a first lens component L1 having positive power, and a second lens component L2 which consists of two lens elements and has negative power as a whole.

In Embodiment 8, the surface of the first lens component L1 which is located on the side of the prisms is designed as an aspherical surface. The Embodiment 8 has the functions and effects which are similar to those of Embodiment 1 and the other embodiments described above.

In the viewfinder optical system according to the present invention, it is desirable for obtaining more favorable image quality to determine power distribution between the first lens component L1 and the second lens component L2 so as to satisfy the following condition (3):

$$-0.08 \leq |f_1/f_2| - 0.57 \times |f/f_2| \leq 0.21 \qquad (3)$$

If the upper limit of the condition (3) is exceeded, the first lens component L1 will have too strong a power, thereby making it difficult to correct mainly astigmatism, coma and distortion. If the lower limit of the condition (3) is exceeded, in contrast, the first lens component L1 will have too weak power, thereby undesirably lowering the retro ratio.

Embodiments 1 through 8 have the values of $|f_1/f_2| - 0.57 \times |f/f_2|$ which are listed below:

| Embodiment 1 | 0.07 |
|---|---|
| Embodiment 2 | 0.02 |
| Embodiment 3 | 0.03 |
| Embodiment 4 | 0.07 |
| Embodiment 5 | 0.10 |
| Embodiment 6 | 0.10 |
| Embodiment 7 | 0.075 |
| Embodiment 8 | 0.09 |

Figure 13:
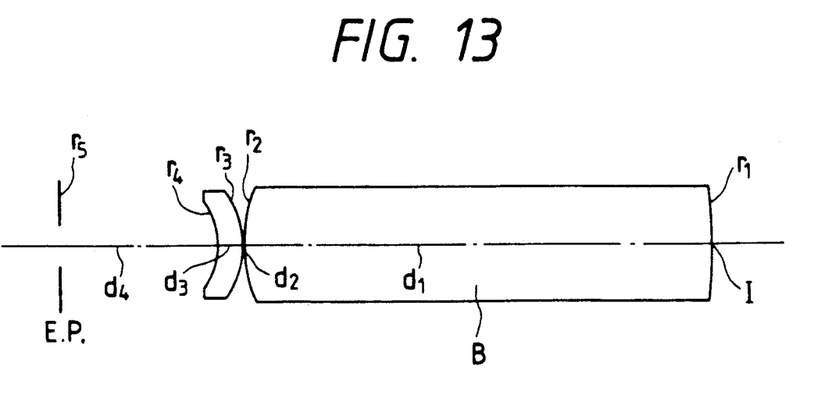
Figure 14:
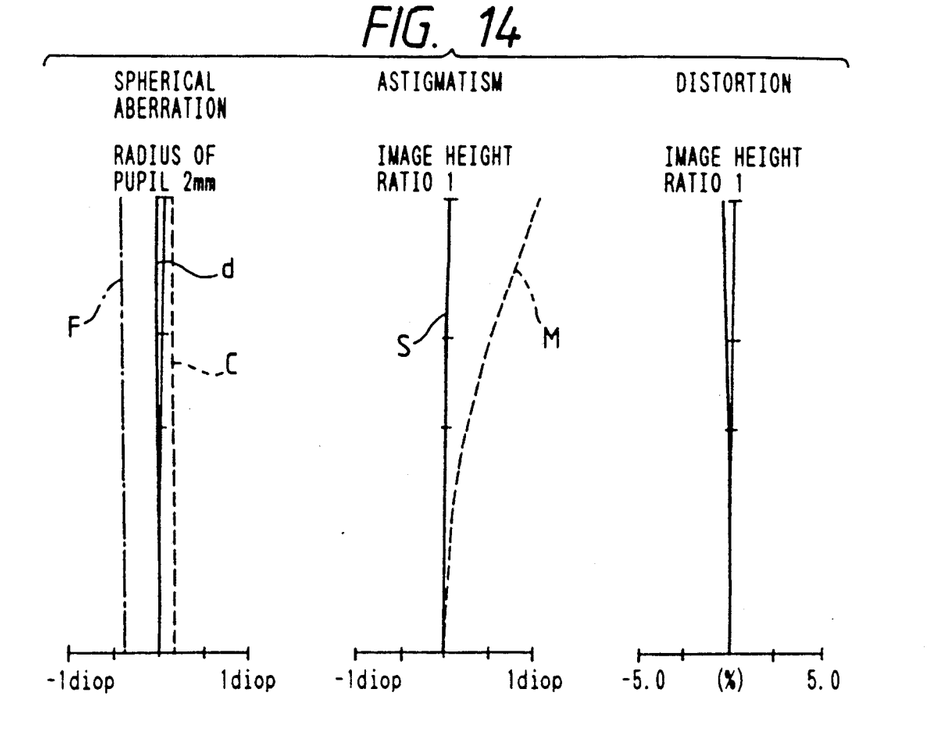
FIG. 14 through FIG. 22 show curves illustrating aberration characteristics of the Embodiments 1 through 9.
Figure 15:
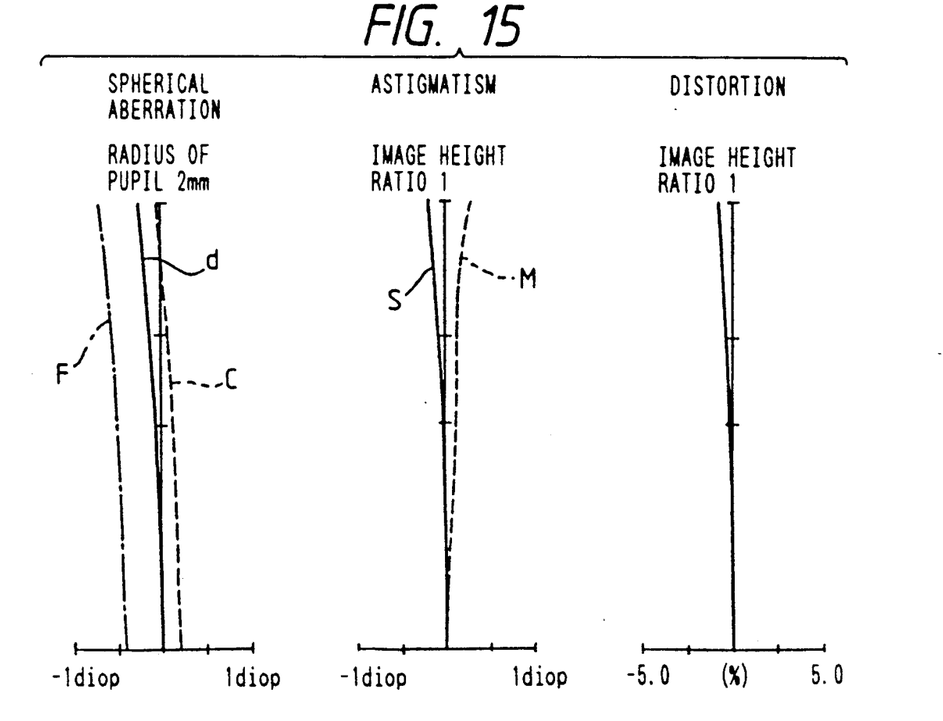
Figure 16:
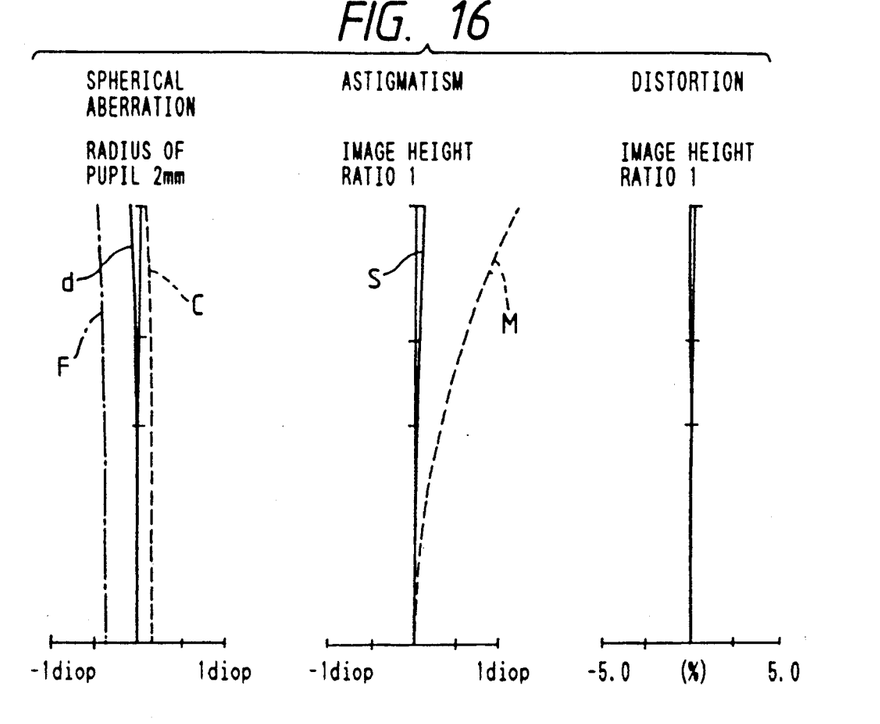
Figure 17:
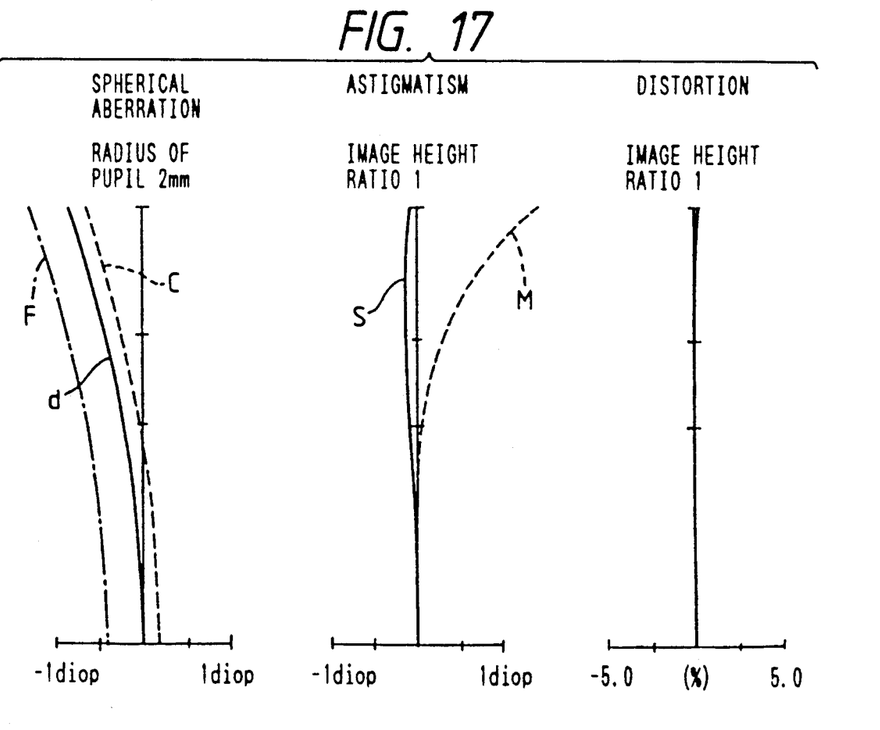
Figure 18:
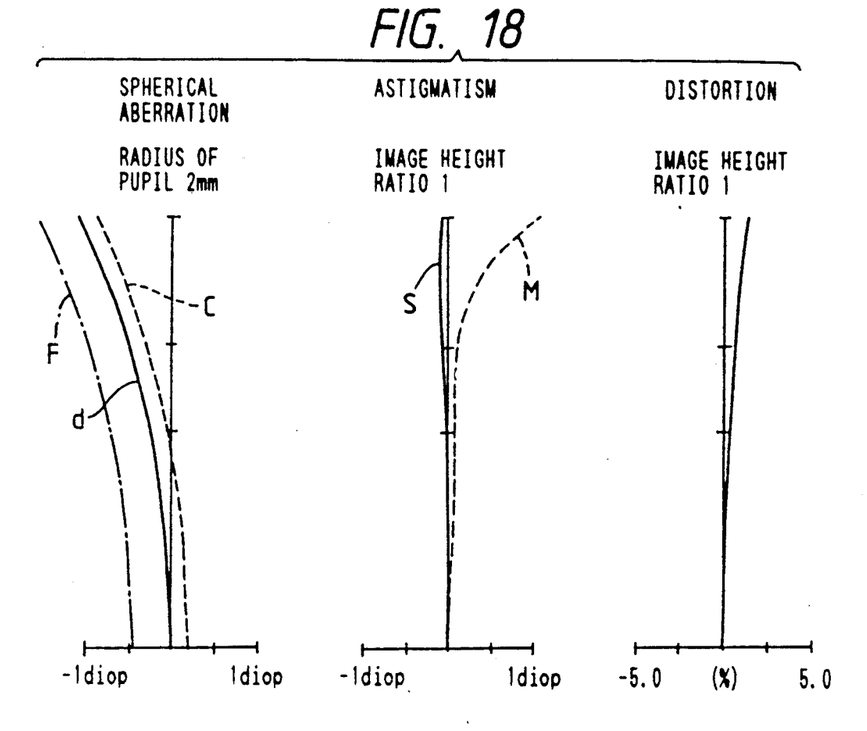
Figure 19:
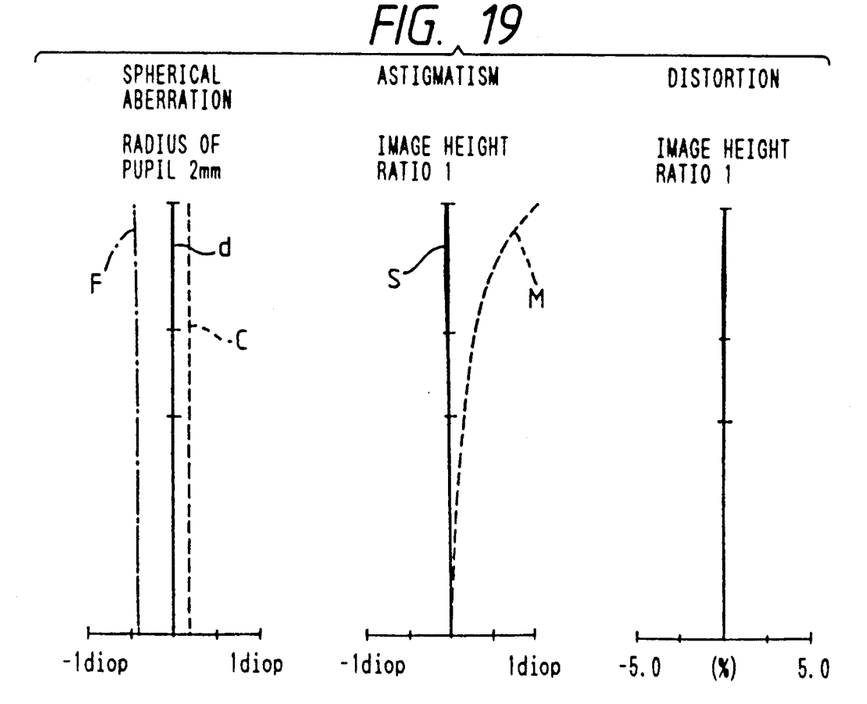
Figure 20:
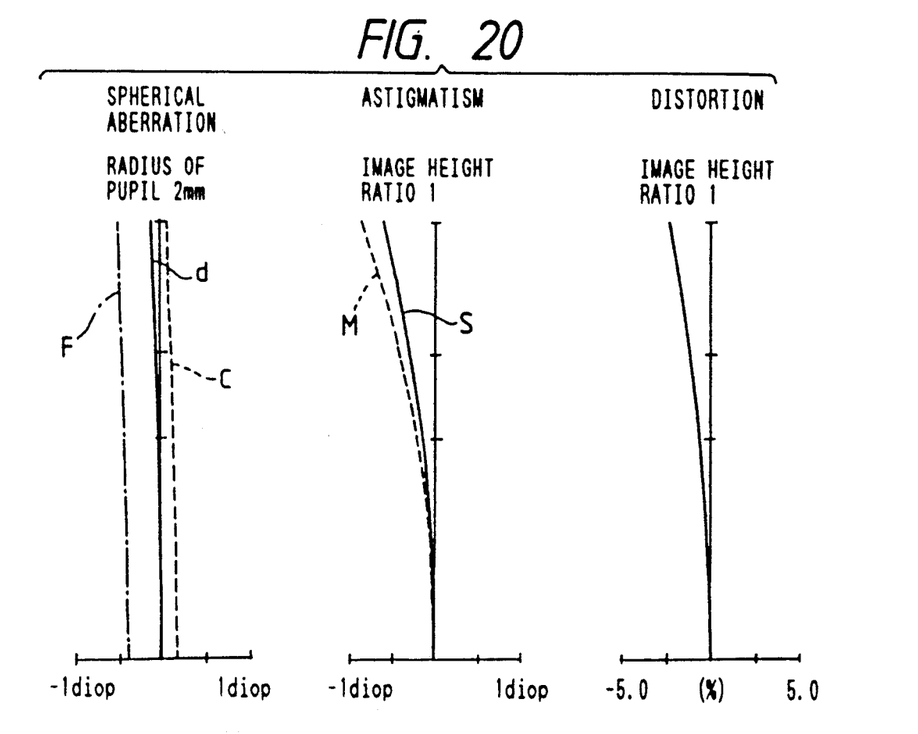
Figure 21:
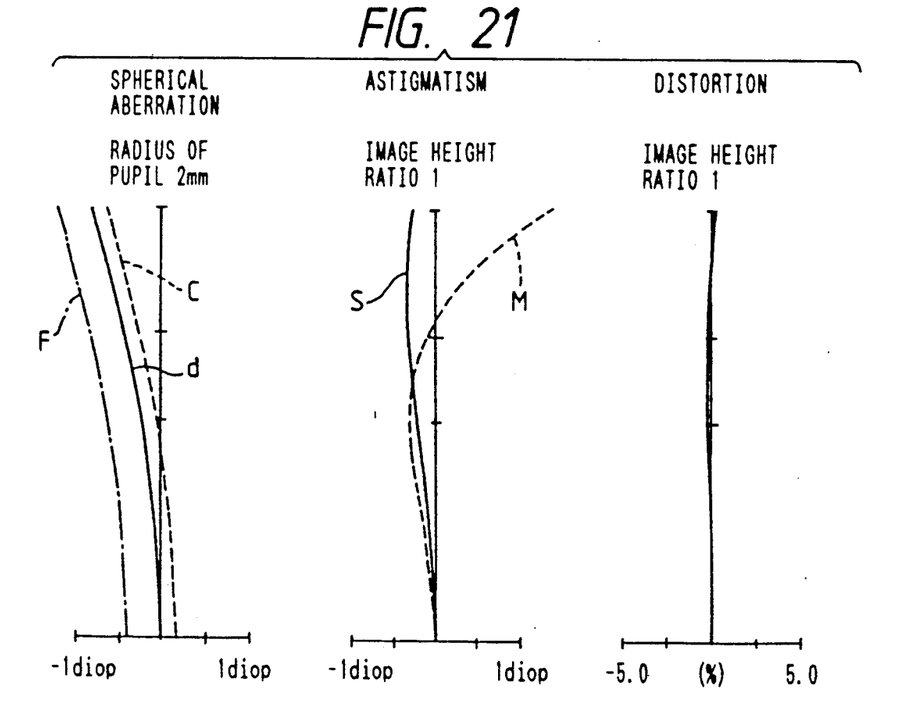
Figure 22:
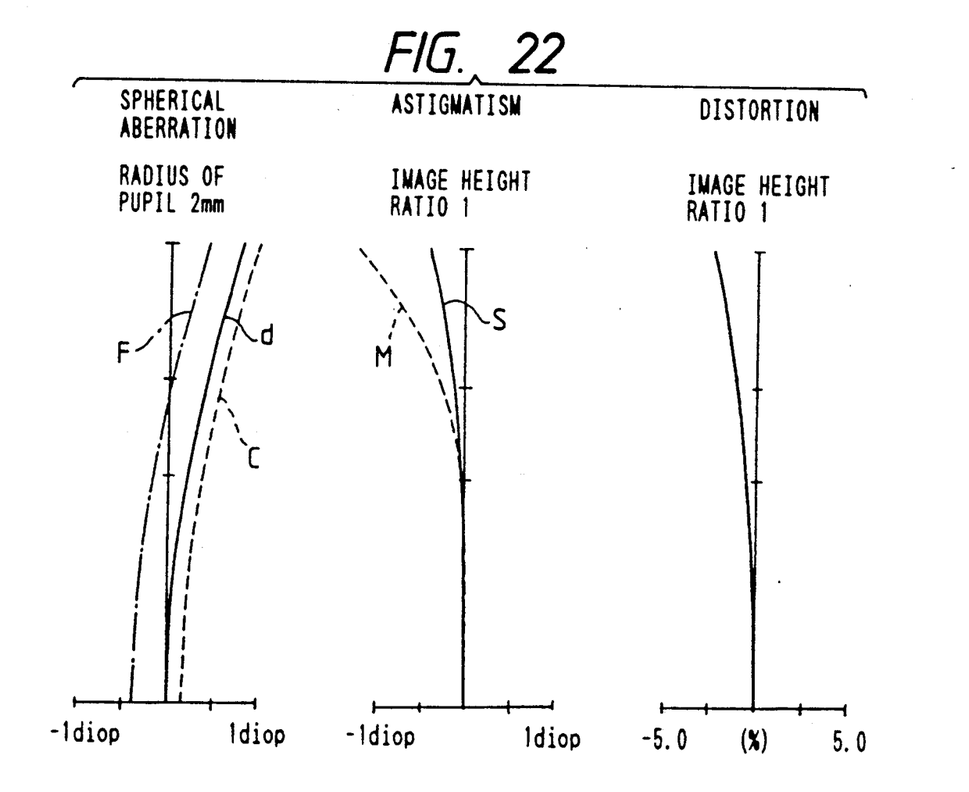

Embodiment 9 has the composition illustrated in FIG. 13 wherein the emergence side surface of the prism section B is designed as a convex surface having positive power, or the prism section is substantially made integral with a first lens component designed as a plano-convex lens which has positive power and a convex surface on the side of the second lens component. That is to say, the emergence side portion of the prism section having the positive power of Embodiment 9 corresponds to the first lens component L1 in each of the other embodiments and the negative lens component of Embodiment 9 corresponds to the second lens component L2 in each of the other embodiments.

The numerical data of the Embodiments 1 through 9 described above are listed sequentially from the intermediate image surface, whereas the sectional views illustrated in FIG. 5 through FIG. 13 are traced from the side of the eye point, i.e., with the eye point set on the left side. The graphs illustrating aberration characteristics of these embodiments are traced as curves obtained by tracing a ray allowed to be incident from the side of the eye point.

By selecting the composition described above, the viewfinder optical system according to the present invention allows the lens components at locations rather shifted toward the eye point as compared with the locations of the lens components in the conventional viewfinder optical system while keeping the locations of the principal points unchanged as viewed from the intermediate image surface, and therefore permits arranging prisms having long optical path lengths while maintaining the same focal length as that of the conventional viewfinder optical system.

I claim:

1. A viewfinder optical system comprising:
    an objective lens system,
    an intermediate image surface for allowing an intermediate image to be formed thereon by said objective lens system, and
    an eyepiece lens system having an eye point at which observation of said intermediate image is allowed, said eyepiece lens system including a first lens component having positive refractive power and a second, negative meniscus lens component having a concave surface on a side thereof proximate the eye point, and
    said eyepiece lens system satisfying the condition (3):

$$-0.08 \leq |f_1/f_2| - 0.57 \cdot |f/f_2| \leq 0.21 \quad (3)$$

wherein the reference symbol f represents the focal length of the eyepiece lens system as a whole, and the reference symbols $f_1$ and $f_2$ designate the focal lengths of the first and second lens components respectively.

2. A viewfinder optical system according to claim 1 wherein an erecting optical system for vertically and horizontally inverting said intermediate image is arranged between said intermediate image surface and said eyepiece lens system.

3. A viewfinder optical system according to claim 2, wherein said erecting optical system includes prisms having a plurality of reflecting surfaces.

4. A viewfinder optical system according to claim 3 wherein said prisms are molded integrally with said first lens component.

5. A viewfinder optical system according to claim 1, 2, 3 or 4 satisfying the following condition (1):

$$0.11 \leq |HB/D_1| + 0.16 \times |f/f_2| \leq 0.91 \quad (1)$$

wherein the reference symbol f1 represents the focal length of the eyepiece lens system located from the intermediate image surface to the eye point, the reference symbol f2 designates the focal length of the second lens component, the reference symbol HB denotes the distance as measured from the eye point to the rear principal point of the eyepiece lens system as a whole and the reference symbol $D_1$ represents the distance as measured from the intermediate image surface to the eye point on the optical axis.

6. A viewfinder optical system according to claim 2 or 4 satisfying the following condition (2):

$$|HB/D_1| - 0.7 \times |D_2/m \cdot IH| \leq -0.15 \quad (2)$$

wherein the reference symbol HB represents the distance as measured from the eye point of the eyepiece lens system to the rear principal point of the eyepiece lens system as a whole, the reference symbol $D_1$ designates the distance as measured from the intermediate image surface to the eye point on the optical axis, the reference symbol $D_2$ denotes the optical path length of the prism section as measured on the optical axis (thickness of the prisms/refractive index of the prisms), the reference symbol IH represents the maximum image height on the intermediate image surface and the reference symbol m designates the number of reflecting surfaces of the prisms.

7. A viewfinder optical system according to claim 3 or 4, wherein an optical member having a reflective power is interposed between said intermediate image surface and a first reflecting surface of said erecting optical system.

8. A viewfinder optical system according to claim 2 or 3 adapted in such a manner that diopter is adjusted by varying an airspace reserved between said erecting optical system and said first lens component.

9. A viewfinder optical system according to claim 1, 2, 3 or 4 wherein said second lens component includes at least two lens elements, and
    wherein said first lens component and at least one of the lens elements comprising said second lens component are made of plastic.

10. A viewfinder optical system according to claim 1 wherein at least one aspherical surface is used on at least one of said first lens component and lens elements composing said second lens component.

11. A viewfinder optical system according to claim 3 wherein a surface of incidence or emergence of said prism section is designed as an aspherical surface.

12. A viewfinder optical system according to claim 1, 2, 3 or 4 wherein said second lens component has an aspherical surface on a side proximate the first lens component.

13. A viewfinder optical system according to claim 1, 2, 3 or 4 wherein said second lens component has an aspherical surface on a side proximate the eye point.

14. A viewfinder optical system according to claim 1, 2, 3 or 4 wherein said first lens component has an aspherical surface on a side proximate the intermediate image surface.

15. A viewfinder optical system according to claim 1, 2, 3 or 4 wherein said first lens component has an aspherical surface on a side proximate the second lens component.

16. A viewfinder optical system according to claim 3 or 4, wherein said erecting optical system includes an aspherical surface at a location close to the first lens component.

17. A viewfinder optical system according to claim 1, 2, 3 or 4, wherein said first lens component consists of two positive lens elements separated from each other.

18. A viewfinder optical system according to claim 1, 2, 3 or 4 wherein said first lens component consists of two lens elements and has negative refractive power as a whole.

* * * * *